US012540750B2

(12) United States Patent
Takenaka et al.

(10) Patent No.: US 12,540,750 B2
(45) Date of Patent: Feb. 3, 2026

(54) CHILLER SYSTEM AND AIR-CONDITIONING APPARATUS INCLUDING CHILLER SYSTEM

(71) Applicant: Mitsubishi Electric Corporation, Tokyo (JP)

(72) Inventors: Shohei Takenaka, Tokyo (JP); Kimitaka Kadowaki, Tokyo (JP); Yuki Mochizuki, Tokyo (JP); Akinori Kurachi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 363 days.

(21) Appl. No.: 18/253,224

(22) PCT Filed: Jan. 22, 2021

(86) PCT No.: PCT/JP2021/002209
§ 371 (c)(1),
(2) Date: May 17, 2023

(87) PCT Pub. No.: WO2022/157918
PCT Pub. Date: Jul. 28, 2022

(65) Prior Publication Data
US 2024/0019160 A1    Jan. 18, 2024

(51) Int. Cl.
*F24F 11/83* (2018.01)
*F24F 11/63* (2018.01)

(52) U.S. Cl.
CPC .............. *F24F 11/83* (2018.01); *F24F 11/63* (2018.01)

(58) Field of Classification Search
CPC ........ F24F 11/83; F24F 11/63; F24F 2110/12; F24F 2140/20; F24F 11/86; F24F 11/85;
(Continued)

(56) References Cited

U.S. PATENT DOCUMENTS 4,274,264 A * 6/1981 Andres ................... F25B 49/02
62/211
6,085,532 A * 7/2000 Sibik .................. G05D 23/1919
62/177
(Continued)

FOREIGN PATENT DOCUMENTS

JP    2014-035092 A    2/2014

OTHER PUBLICATIONS

International Search Report of the International Searching Authority mailed Mar. 2, 2021 in corresponding International Application No. PCT/JP2021/002209 (and English translation).

*Primary Examiner* — Christopher E. Everett
(74) *Attorney, Agent, or Firm* — Posz Law Group, PLC

(57) ABSTRACT

A chiller system includes: a chiller; a load; a feed pipe through which water flows from the chiller to the load; a return pipe through which water flows to the chiller from the load; a first controller that controls the chiller; and a second controller that outputs a chiller operating command to the first controller. The chiller includes a first sensor, a second sensor, and a third sensor. The first sensor measures an inlet water temperature of water flowing through the return pipe. The second sensor measures an outlet water temperature of water flowing through the feed pipe. The third sensor measures an outside air temperature at a chiller installation location. The first controller calculates a temperature range for the chiller based on an inlet water temperature, an outlet water temperature, and an outside air temperature, and then outputs the temperature range to the second controller.

15 Claims, 11 Drawing Sheets

(58) Field of Classification Search
CPC .. F25B 2600/0251; F25B 13/00; F25B 49/02; F25B 2400/06; F25B 2600/0253; F25B 2700/2106; F25B 2700/21172; F25B 2700/21173
See application file for complete search history.

(56) References Cited

U.S. PATENT DOCUMENTS

| | | | |
|---|---|---|---|
| 9,982,903 B1* | 5/2018 | Ridder | F24F 11/70 |
| 2015/0354849 A1* | 12/2015 | Matsuo | F25D 17/02 |
| | | | 62/181 |
| 2016/0102881 A1* | 4/2016 | Kim | F24F 11/30 |
| | | | 165/218 |
| 2022/0186944 A1* | 6/2022 | Kirkman | F25B 49/027 |
| 2022/0205661 A1* | 6/2022 | Fujita | G05D 23/1917 |
| 2022/0228766 A1* | 7/2022 | Nakahara | F25B 49/02 |

* cited by examiner

CHILLER SYSTEM AND AIR-CONDITIONING APPARATUS INCLUDING CHILLER SYSTEM

CROSS REFERENCE TO RELATED APPLICATION

This application is a U.S. national stage application of PCT/JP2021/002209 filed on Jan. 22, 2021, the contents of which are incorporated herein by reference.

TECHNICAL FIELD

The present disclosure relates to a chiller system that controls a chiller, and also relates to an air-conditioning apparatus including the chiller system.

BACKGROUND ART

There are air-conditioning apparatuses known as having a chiller. These air-conditioning apparatuses use a heat source device installed outside a building to cool or heat water in the chiller.

The chiller is connected to a load, such as a fan coil unit in an indoor unit or a panel heater, by a feed pipe and a return pipe through which water flows. The cooled or heated water flows through the feed pipe and is delivered to the load to cool or heat the load. The water having cooled or heated the load flows through the return pipe and flows back to the chiller. At the site where the load is provided, a control panel is installed. The control panel controls one or more chillers, and outputs an operating command including information on a target outlet water temperature to the one or more chillers.

CITATION LIST

Patent Literature

Patent Literature 1: Japanese Unexamined Patent Application Publication No. 2014-35092

SUMMARY OF INVENTION

Technical Problem

However, the highest outlet water temperature and the lowest outlet water temperature in the chillers may vary depending on the operating conditions such as the outside air temperature and the outlet and inlet water temperatures. Therefore, when the operating command including information on the target outlet water temperature instructed from the control panel does not fall within an operational temperature range of the chillers, this prevents the chillers from being operated in accordance with the operating command.

The present disclosure has been made in view of the above circumstances, and it is an object of the present disclosure to provide a chiller system in which a chiller can supply water at a target outlet water temperature, and an air-conditioning apparatus including the chiller system.

Solution to Problem

A chiller system according to one embodiment of the present disclosure includes: a chiller configured to output water at an adjusted temperature; a load of the chiller; a feed pipe through which water flows to be supplied from the chiller to the load, the feed pipe being connected between the chiller and the load; a return pipe through which water flows back to the chiller from the load, the return pipe being connected between the chiller and the load; a first controller configured to control the chiller; and a second controller configured to output a chiller operating command to control the chiller to the first controller, wherein the chiller includes a first sensor configured to measure an inlet water temperature of the water flowing through the return pipe to the chiller, a second sensor configured to measure an outlet water temperature of the water flowing through the feed pipe from the chiller, and a third sensor configured to measure an outside air temperature at a location where the chiller is installed, and the first controller calculates a temperature range that is operational for the chiller based on an inlet water temperature measured by the first sensor, an outlet water temperature measured by the second sensor, and an outside air temperature measured by the third sensor, and then outputs information on the calculated temperature range to the second controller.

Advantageous Effects of Invention

In the chiller system according to one embodiment of the present disclosure, the second controller can obtain a temperature range that is operational for the chiller from the first controller. Therefore, the second controller can output an appropriate operating command in response to the temperature range that is operational for the chiller. This allows the chiller to supply water at a target outlet water temperature that is set within the operational temperature range in accordance with the operating command.

DESCRIPTION OF EMBODIMENTS

Figure 1:
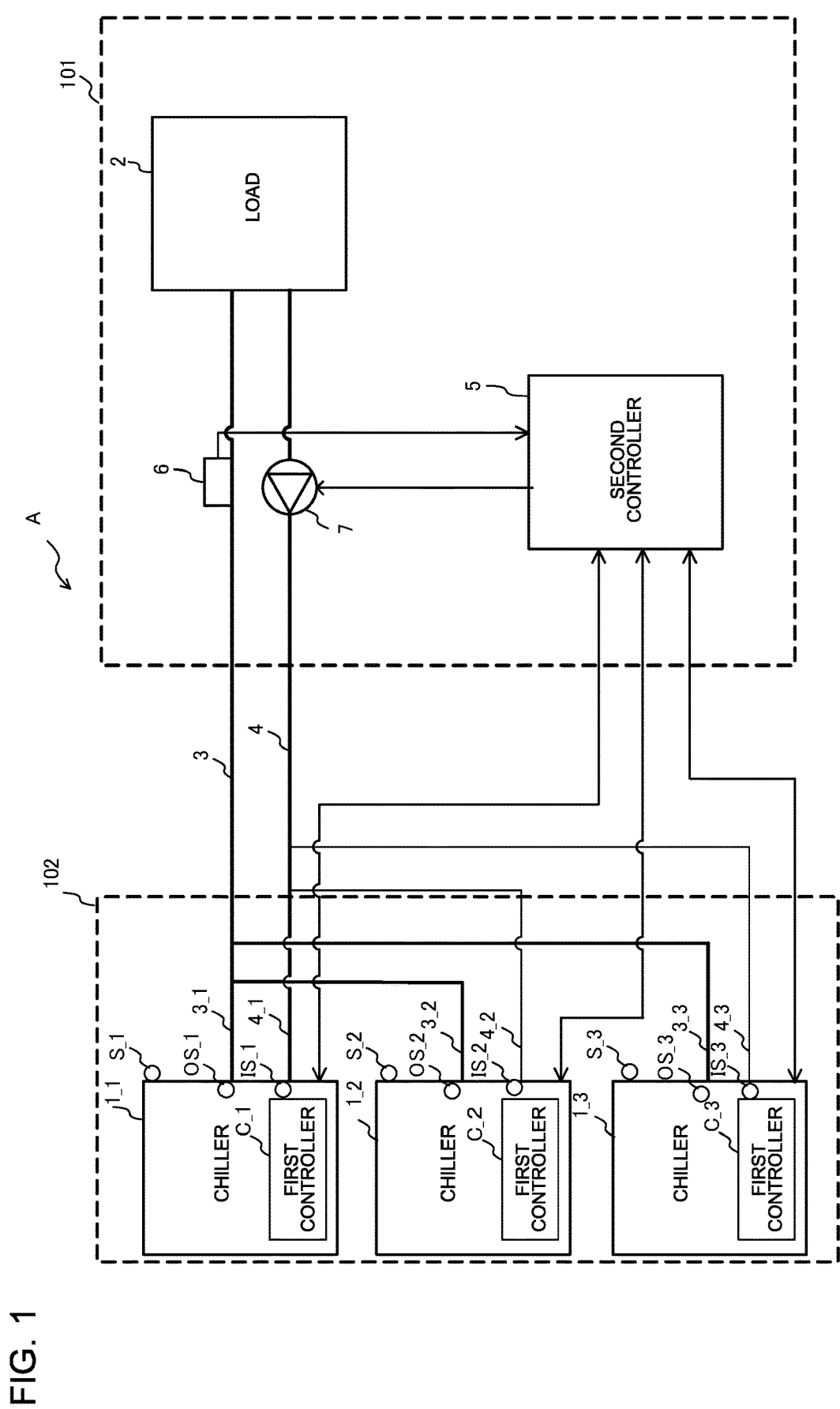
FIG. 1 illustrates the configuration of a chiller system in an air-conditioning apparatus according to Embodiment 1.

Hereinafter, a chiller system according to an embodiment will be described with reference to the drawings. Note that the same constituent elements in the drawings are denoted by the same reference numerals, and redundant explanation will be omitted appropriately. The present disclosure may include all combinations of configurations that can be combined among the configurations explained in each embodiment described below.

Embodiment 1

FIG. 1 illustrates the configuration of a chiller system A in an air-conditioning apparatus according to Embodiment 1.

Note that a chiller 1_1, a chiller 1_2, and a chiller 1_3 are also referred to as "chiller 1" when it is not necessary to distinguish between them. The same applies to other constituent elements.

Configuration of Chiller System A

As illustrated in FIG. 1, the chiller system A includes the chiller 1_1, the chiller 1_2, and the chiller 1_3. The chiller 1_1, the chiller 1_2, and the chiller 1_3 are provided in an outdoor unit 102 of the air-conditioning apparatus. A load 2, a second controller 5, a water temperature sensor 6, and a water delivery pump 7 are provided in an indoor unit 101.

The chiller 1_1, the chiller 1_2, and the chiller 1_3 cool or heat input water, and output and circulate the cooled or heated water. Note that the water may be antifreeze. In Embodiment 1, while three units of chillers 1_1, 1_2, and 1_3 are illustrated, it suffices that the number of chillers 1 is equal to or larger than one.

For example, a heat exchanger in the air-conditioning apparatus is used for a heat source of the chiller 1_1, the chiller 1_2, and the chiller 1_3. Specifically, a heat pump is used as the heat source, and water in the chiller system A exchanges heat with refrigerant flowing through the heat exchanger in the air-conditioning apparatus.

The chiller 1_1 is provided with a first sensor IS_1 configured to measure the inlet water temperature of the chiller 1_1. The chiller 12 is provided with a first sensor IS_2 configured to measure the inlet water temperature of the chiller 1_2. The chiller 13 is provided with a first sensor IS_3 configured to measure the inlet water temperature of the chiller 1_3.

The chiller 1_1 is provided with a second sensor OS_1 configured to measure the inlet water temperature of the chiller 1_1. The chiller 1_2 is provided with a second sensor OS_2 configured to measure the inlet water temperature of the chiller 1_2. The chiller 1_3 is provided with a second sensor OS_3 configured to measure the inlet water temperature of the chiller 1_3.

Outside the chiller 1_1, a third sensor S_1 configured to measure the outside air temperature of the chiller 1_1 is provided. Outside the chiller 1_2, a third sensor S_2 configured to measure the outside air temperature of the chiller 1_2 is provided. Outside the chiller 1_3, a third sensor S_2 configured to measure the outside air temperature of the chiller 1_3 is provided.

The chiller 1_1 includes a first controller C_1. The first controller C_1 controls the chiller 1_1 in its entirety. The first controller C_1 calculates a first temperature range that is operational for the chiller 1_1 based on the inlet water temperature measured by the first sensor IS_1, the outlet water temperature measured by the second sensor OS_1, and the outside air temperature measured by the third sensor S_1. The first controller C_1 transmits information on the first temperature range to the second controller 5. The chiller 1_2 includes a first controller C_2. The first controller C_2 controls the chiller 1_2 in its entirety. The first controller C_2 calculates a second temperature range that is operational for the chiller 1_1 based on the inlet water temperature measured by the first sensor IS_2, the outlet water temperature measured by the second sensor OS_2, and the outside air temperature measured by the third sensor S_2. The first controller C_2 transmits information on the second temperature range to the second controller 5. The chiller 1_3 includes a first controller C_3. The first controller C_3 controls the chiller 1_3 in its entirety. The first controller C_3 calculates a third temperature range that is operational for the chiller 1_3 based on the inlet water temperature measured by the first sensor IS_3, the outlet water temperature measured by the second sensor OS_3, and the outside air temperature measured by the third sensor S_3. The first controller C_3 transmits information on the third temperature range to the second controller 5.

The temperature range is calculated by the first controller C by using, for example, a table that defines the relationship between the temperature range and the inlet water temperature, outlet water temperature, and outside air temperature of the chiller 1.

Note that the first controller C_1, the first controller C_2, and the first controller C_3 in the chiller 1 may be a controller of the air-conditioning apparatus. The first controller C_1, the first controller C_2, and the first controller C_3 may communicate with the second controller 5 either through a wire or wireless communication.

The first controller C is made up of dedicated hardware or a central processing unit (CPU, also referred to as "processing device," "computation device," "microprocessor," "microcomputer," or "processor") configured to execute programs stored in a memory. When the first controller C is dedicated hardware, the first controller C is equivalent to, for example, a single circuit, a combined circuit, an application specific integrated circuit (ASIC), a field programmable gate array (FPGA), or a combination thereof. The functional units of the first controller C may be individually implemented by separate units of hardware, or the functional units of the first controller C may be implemented together by a single unit of hardware. When the first controller C is a CPU, the functions to be executed by the first controller C are implemented by software, firmware, or a combination of the software and the firmware. The software and the firmware are described as programs and stored in the memory. The CPU reads and executes the programs stored in the memory, thereby to implement the functions of the first controller C. For example, the memory is a nonvolatile or volatile semiconductor memory such as a RAM, a ROM, a flash memory, an EPROM, or an EEPROM. Note that the functions of the first controller C may be partially implemented by dedicated hardware, while being partially implemented by software or firmware.

The chiller 1_1 and the load 2 are connected by a feed pipe 3 and a return pipe 4 in which heated or cooled water flows.

The feed pipe 3 branches off into a feed pipe 3_1, a feed pipe 3_2, and a feed pipe 33 near the chiller 1. The chiller 1_1 is connected to the feed pipe 31 of the feed pipe 3. The chiller 1_2 is connected to the feed pipe 3_2 of the feed pipe 3. The chiller 1_3 is connected to the feed pipe 3_3 of the feed pipe 3.

The return pipe 4 branches off into a return pipe 4_1, a return pipe 4_2, and a return pipe 4_3. The chiller 1_1 is connected to the return pipe 4_1 of the return pipe 4. The chiller 1_2 is connected to the return pipe 4_2 of the return pipe 4. The chiller 1_3 is connected to the return pipe 43 of the return pipe 4.

The load 2 is connected to the feed pipe 3 and the return pipe 4. The load 2 refers to some of the components of the indoor unit 101 in the air-conditioning apparatus, such as a fan coil unit. The load 2 is not limited to being a component of the air-conditioning apparatus.

The feed pipe 3 is provided with the water temperature sensor 6. The water temperature sensor 6 is provided on the feed pipe 3 in the vicinity of the load 2. The water temperature sensor 6 measures the temperature of water flowing in the feed pipe 3 to be input to the load 2, and outputs information on the measured temperature to the second controller 5.

The return pipe 4 is provided with the water delivery pump 7. The water delivery pump 7 delivers water flowing through the return pipe 4 from the load 2 to the chiller 1.

The water delivery pump 7 adjusts the water flow rate of water flowing through the return pipe 4 based on a first operating command including information on the water flow rate and output from the second controller 5. Note that the water delivery pump 7 may be provided on the feed pipe 3.

The second controller 5 is provided on a control board of the load 2 in the indoor unit 101. The second controller 5 calculates a water flow rate at which water is discharged from the water delivery pump 7 based on information on the first temperature range output from the first controller C_1, the second temperature range output from the first controller C_2, and the third temperature range output from the first controller C_3. The second controller 5 outputs the first operating command including information on the calculated water flow rate to the water delivery pump 7. Accordingly, the water delivery pump 7 delivers water at the water flow rate instructed by the first operating command. That is, the second controller 5 controls the flow rate of water flowing through the feed pipe 3 and the return pipe 4 by outputting the first operating command.

The water flow rate for the water delivery pump 7 controlled by the second controller 5 is calculated by, for example, using a table that defines the relationship between the water flow rate for the water delivery pump 7 and the first, second, and third temperature ranges.

The second controller 5 receives information on a target outlet water temperature of the chiller 1_1, a target outlet water temperature of the chiller 1_2, and a target outlet water temperature of the chiller 1_3. The second controller 5 may receive information on the target outlet water temperatures constantly or regularly.

Based on information on the temperature of water flowing in the feed pipe 3 measured by the water temperature sensor 6, the temperature range output from the first controller C, and the target outlet water temperature of the chiller 1 output from the first controller C, the second controller 5 outputs an operating command to control the chiller 1.

Specifically, the second controller 5 outputs a chiller operating command to the first controller C_1 based on the water temperature measured by the water temperature sensor 6 and the target outlet water temperature of the chiller 1_1. The second controller 5 outputs a chiller operating command to the first controller C_2 based on the water temperature measured by the water temperature sensor 6 and the target outlet water temperature of the chiller 1_2. The second controller 5 outputs a chiller operating command to the first controller C_3 based on the water temperature measured by the water temperature sensor 6 and the target outlet water temperature of the chiller 1_3.

The second controller 5 compares the water temperature measured by the water temperature sensor 6 with the target outlet water temperature designated to the chiller 1_1. When the water temperature measured by the water temperature sensor 6 does not reach the target outlet water temperature, the second controller 5 determines whether the target outlet water temperature falls within the temperature range of the chiller 1_1. When the target outlet water temperature falls within the temperature range of the chiller 1_1, the second controller 5 outputs a chiller operating command to the chiller 1_1, including information on continuation of operation or the target outlet water temperature. When receiving the chiller operating command, the chiller 1_1 continues operation or operates in such a manner that the outlet water temperature of the chiller 1_1 becomes the target outlet water temperature. When the target outlet water temperature falls outside the temperature range of the chiller 1_1, the operating capacity of the chiller 1_1 is either excessive or insufficient. Accordingly, the second controller 5 outputs a chiller operating command to control the heat source of the outdoor unit 102 and the water delivery pump 7 to the chiller 1_1.

For example, when the capacity of the chiller 1_1 is insufficient, the second controller 5 outputs a chiller operating command to the chiller 1_1 to execute such a control as to decrease the frequency of the water delivery pump 7 in the chiller system A and maximize the frequency of a compressor in the outdoor unit 102. When the capacity of the chiller 1_1 is excessive, the second controller 5 outputs a chiller operating command to the chiller 1_1 to execute such a control as to increase the frequency of the water delivery pump 7 in the chiller system A and minimize the frequency of the compressor in the outdoor unit 102. When the water temperature measured by the water temperature sensor 6 is the target outlet water temperature, the second controller 5 outputs a chiller operating command including an operation stop command to the chiller 1_1. When receiving the chiller operating command including an operation stop command, the chiller 11 stops operation.

Specifically, the second controller 5 compares the water temperature measured by the water temperature sensor 6 with the target outlet water temperature designated to the chiller 1_2. When the water temperature measured by the water temperature sensor 6 does not reach the target outlet water temperature, the second controller 5 determines whether the target outlet water temperature falls within the temperature range of the chiller 1_2. When the target outlet water temperature falls within the temperature range of the chiller 1_2, the second controller 5 outputs a chiller operating command to the chiller 1_2, including information on continuation of operation or the target outlet water temperature. When receiving the chiller operating command, the chiller 1_2 continues operation or operates in such a manner that the outlet water temperature of the chiller 1_2 becomes the target outlet water temperature. When the target outlet water temperature falls outside the temperature range of the chiller 1_2, the operating capacity of the chiller 1_2 is either excessive or insufficient. Accordingly, the second controller 5 outputs a chiller operating command to control the heat source of the outdoor unit 102 and the water delivery pump 7 to the chiller 1_2.

For example, when the capacity of the chiller 1_2 is insufficient, the second controller 5 outputs a chiller operating command to the chiller 1_2 to execute such a control as to decrease the frequency of the water delivery pump 7 in the chiller system A and maximize the frequency of the compressor in the outdoor unit 102. When the capacity of the chiller 1_2 is excessive, the second controller 5 outputs a chiller operating command to the chiller 1_2 to execute such a control as to increase the frequency of the water delivery pump 7 in the chiller system A and minimize the frequency of the compressor in the outdoor unit 102. When the water temperature measured by the water temperature sensor 6 is the target outlet water temperature, the second controller 5 outputs a chiller operating command including an operation stop command to the chiller 1_2. When receiving the chiller operating command including an operation stop command, the chiller 1_2 stops operation.

The second controller 5 compares the water temperature measured by the water temperature sensor 6 with the target outlet water temperature designated to the chiller 1_3. When the water temperature measured by the water temperature sensor 6 does not reach the target outlet water temperature, the second controller 5 determines whether the target outlet water temperature falls within the temperature range of the chiller 1_3. When the target outlet water temperature falls within the temperature range of the chiller 1_3, the second controller 5 outputs a chiller operating command to the chiller 1_3, including information on continuation of operation or the target outlet water temperature. When receiving the chiller operating command, the chiller 1_3 continues operation or operates in such a manner that the outlet water temperature of the chiller 1_3 becomes the target outlet water temperature. When the target outlet water temperature falls outside the temperature range of the chiller 1_3, the operating capacity of the chiller 1_3 is either excessive or insufficient. Accordingly, the second controller 5 outputs a chiller operating command to control the heat source of the outdoor unit 102 and the water delivery pump 7 to the chiller 1_3.

For example, when the capacity of the chiller 1_3 is insufficient, the second controller 5 outputs a chiller operating command to the chiller 1_3 to execute such a control as to decrease the frequency of the water delivery pump 7 in the chiller system A and maximize the frequency of the compressor in the outdoor unit 102. When the capacity of the chiller 1_3 is excessive, the second controller 5 outputs a chiller operating command to the chiller 1_3 to execute such a control as to increase the frequency of the water delivery pump 7 in the chiller system A and minimize the frequency of the compressor in the outdoor unit 102. When the water temperature measured by the water temperature sensor 6 is the target outlet water temperature, the second controller 5 outputs a chiller operating command including an operation stop command to the chiller 1_3. When receiving the chiller operating command including an operation stop command, the chiller 13 stops operation.

The second controller 5 is made up of dedicated hardware or a central processing unit (CPU, also referred to as "processing device," "computation device," "microprocessor," "microcomputer," or "processor") configured to execute programs stored in a memory. When the second controller 5 is dedicated hardware, the second controller 5 is equivalent to, for example, a single circuit, a combined circuit, an application specific integrated circuit (ASIC), a field programmable gate array (FPGA), or a combination thereof. The functional units of the second controller 5 may be individually implemented by separate units of hardware, or the functional units of the second controller 5 may be implemented together by a single unit of hardware. When the second controller 5 is a CPU, the functions to be executed by the second controller 5 are implemented by software, firmware, or a combination of the software and the firmware. The software and the firmware are described as programs and stored in the memory. The CPU reads and executes the programs stored in the memory, thereby to implement the functions of the second controller 5. For example, the memory is a nonvolatile or volatile semiconductor memory such as a RAM, a ROM, a flash memory, an EPROM, or an EEPROM. Note that the functions of the second controller 5 may be partially implemented by dedicated hardware, while being partially implemented by software or firmware.

Figure 2:
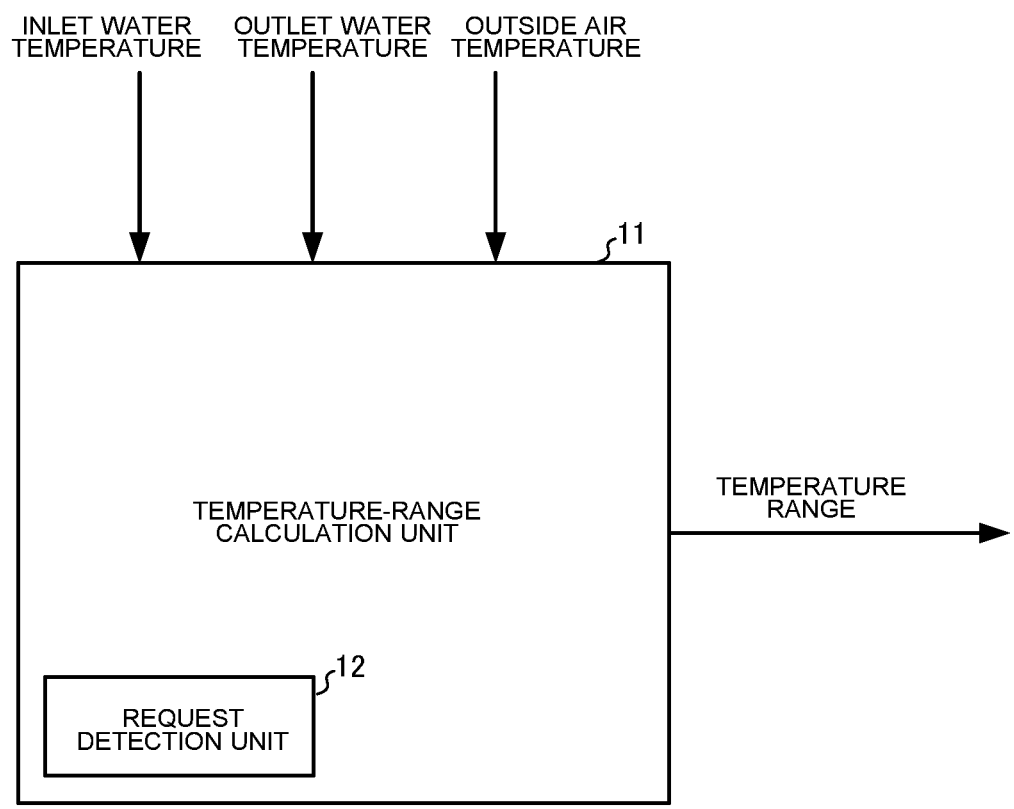
FIG. 2 is a functional block diagram of a chiller in the air-conditioning apparatus according to Embodiment 1.

FIG. 2 is a functional block diagram of the chiller 1 in the air-conditioning apparatus according to Embodiment 1.

As illustrated in FIG. 2, the chiller 1 includes a temperature-range calculation unit 11. The temperature-range calculation unit 11 includes a request detection unit 12.

The temperature-range calculation unit 11 calculates an operational temperature range of the chiller 1 based on the inlet water temperature measured by the first sensor IS, the outlet water temperature measured by the second sensor OS, and the outside air temperature measured by the third sensor S, and then outputs information on the calculated temperature range to the second controller 5.

Specifically, the temperature-range calculation unit 11 calculates an operational temperature range of the chiller 1_1 based on the inlet water temperature measured by the first sensor IS_1, the outlet water temperature measured by the second sensor OS_1, and the outside air temperature measured by the third sensor S_1. Then, the temperature-range calculation unit 11 outputs information on the calculated operational temperature range of the chiller 1_1 to the second controller 5. The temperature-range calculation unit 11 calculates an operational temperature range of the chiller 1_2 based on the inlet water temperature measured by the first sensor IS_2, the outlet water temperature measured by the second sensor OS_2, and the outside air temperature measured by the third sensor S_2. Then, the temperature-range calculation unit 11 outputs information on the calculated operational temperature range of the chiller 1_2 to the second controller 5. The temperature-range calculation unit 11 calculates an operational temperature range of the chiller 1_3 based on the inlet water temperature measured by the first sensor IS_3, the outlet water temperature measured by the second sensor OS_3, and the outside air temperature measured by the third sensor S_3. Then, the temperature-range calculation unit 11 outputs information on the calculated operational temperature range of the chiller 1_3 to the second controller 5.

The request detection unit 12 is connected to the second controller 5 through wired communication or wireless communication, and detects a request for calculation of a temperature range transmitted from the second controller 5.

When the request detection unit 12 detects the request, the temperature-range calculation unit 11 calculates a temperature range of the chiller 1.

Figure 3:
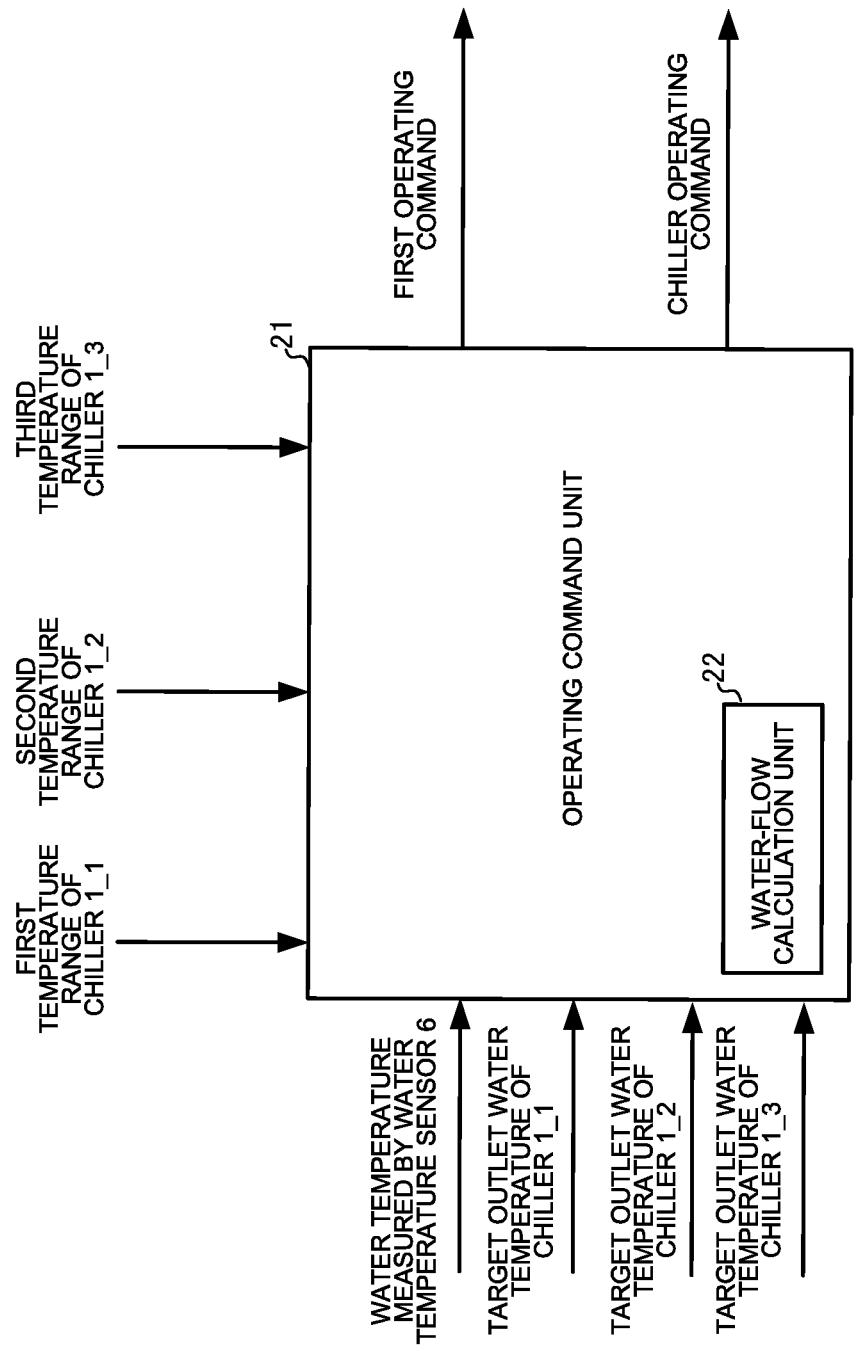
FIG. 3 is a functional block diagram of a second controller in the air-conditioning apparatus according to Embodiment 1.

FIG. 3 is a functional block diagram of the second controller 5 in the air-conditioning apparatus according to Embodiment 1.

As illustrated in FIG. 3, the second controller 5 includes an operating command unit 21. The operating command unit 21 incudes a water-flow calculation unit 22.

The water-flow calculation unit 22 calculates a water flow rate for the water delivery pump 7 based on information on the first temperature range output from the first controller C1_1, the second temperature range output from the first controller C_2, and the third temperature range output from the first controller C_3. The water-flow calculation unit 22 outputs a first operating command including information on the calculated water flow rate to the water delivery pump 7.

The operating command unit 21 outputs a chiller operating command to the chiller 1 based on information on the temperature range received from the first controller C, the water temperature measured by the water temperature sensor 6, and the target outlet water temperature of the chiller 1.

Specifically, the operating command unit 21 outputs a chiller operating command to the chiller 1 based on information on the temperature range received from the first controller C_1, the water temperature measured by the water temperature sensor 6, and the target outlet water temperature of the chiller 1_1. The operating command unit 21 outputs a chiller operating command to the chiller 1 based on information on the temperature range received from the first controller C_2, the water temperature measured by the water temperature sensor 6, and the target outlet water temperature of the chiller 1_2. The operating command unit 21 outputs a chiller operating command to the chiller 1 based on information on the temperature range received from the first controller C_3, the water temperature measured by the water temperature sensor 6, and the target outlet water temperature of the chiller 1_3.

<Operation of Chiller System A>

Next, operation of the chiller system A in the air-conditioning apparatus according to Embodiment 1 is described.

<Water Circulating Operation in Chiller System A>

In FIG. 1, water flowing out from the chiller 1_1 flows through the feed pipe 3_1. Water flowing out from the chiller 1_2 flows through the feed pipe 3_2. Water flowing out from the chiller 1_3 flows through the feed pipe 3_3. The flows of water through the feed pipe 3_1, the feed pipe 3_2, and the feed pipe 3_3 merge together at the feed pipe 3.

The water flowing through the feed pipe 3 exchanges heat with the load 2, and cools or heats the load 2.

The water having exchanged heat with the load 2 flows through the return pipe 4. The flow of water through the return pipe 4 then branches off into the return pipe 4_1, the return pipe 4_2, and the return pipe 4_3.

Water flowing through the return pipe 4_1 is input to the chiller 1_1. Water flowing through the return pipe 4_2 is input to the chiller 1_2. Water flowing through the return pipe 43 is input to the chiller 1_3. In this manner, water circulates between the chiller 1_1 and the load 2, between the chiller 1_2 and the load 2, and between the chiller 1_3 and the load 2.

<Operation of Chiller 1>

Figure 4:
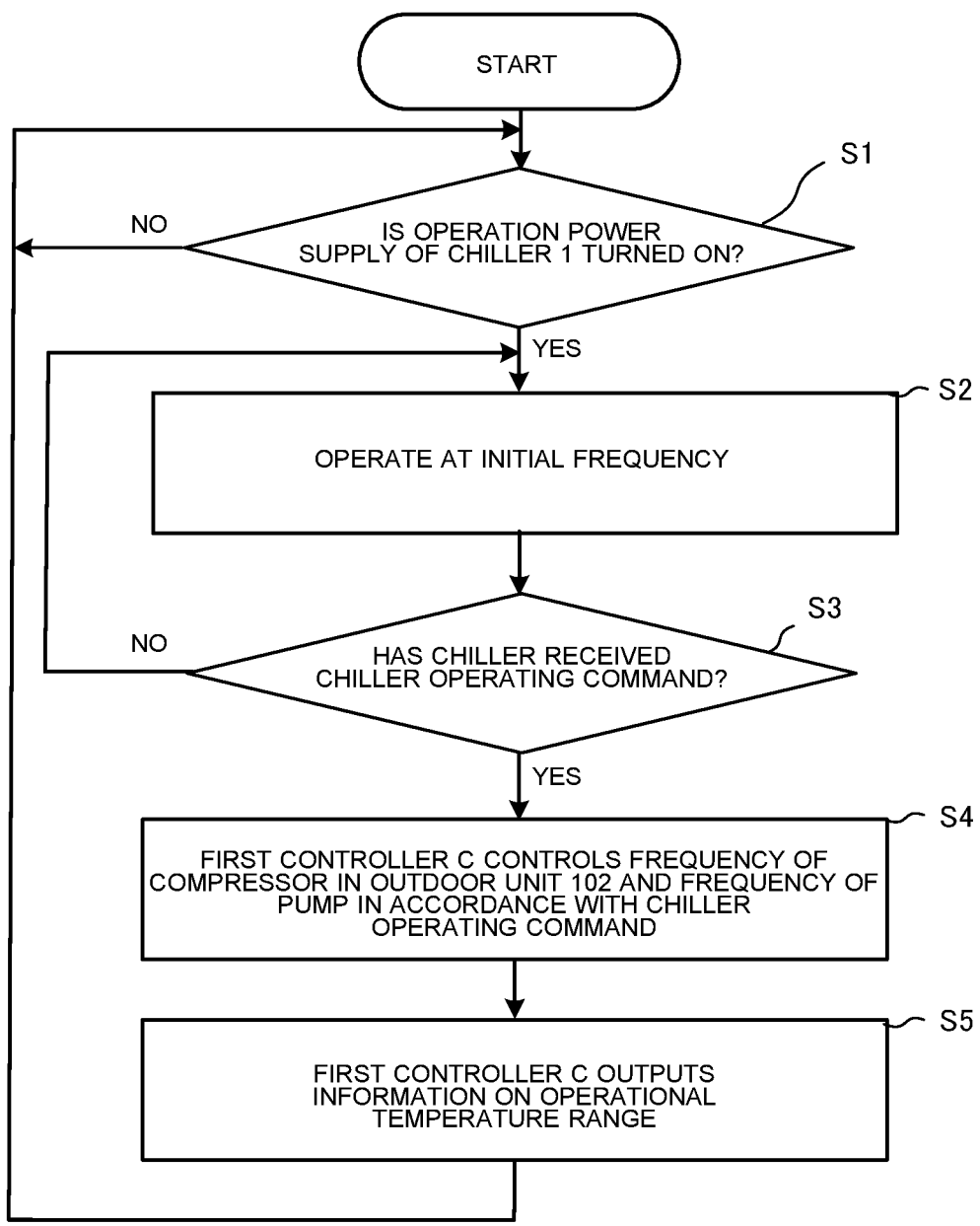
FIG. 4 is a flowchart for describing operation of the chiller in the air-conditioning apparatus according to Embodiment 1.

FIG. 4 is a flowchart for describing operation of the chiller 1 in the air-conditioning apparatus according to Embodiment 1.

As illustrated in FIG. 4, the first controller C in the chiller 1 determines whether an operation power supply of the chiller 1 is turned on (step S1). In step S1, when determining that the operation power supply of the chiller 1 is not turned on (NO in step S1), the first controller C continuously performs the determination in step S1. In step S1, when the first controller C determines that the operation power supply of the chiller 1 is turned on (YES in step S1), the chiller 1 starts operating at an initial frequency (step S2). For example, the initial frequency refers to a frequency of a compressor in an outdoor unit when the chiller system A is included in an air-conditioning apparatus 103.

Next, the first controller C determines whether the chiller 1 has received a chiller operating command from the second controller 5 (step S3). In step S3, when the first controller C determines that the chiller 1 does not receive a chiller operating command from the second controller 5 (NO in step S3), the first controller C returns to the process in step S2. In step S3, when the first controller C determines that the chiller 1 has received a chiller operating command from the second controller 5 (YES in step S3), the first controller C controls the frequency of the compressor in the outdoor unit 102 and the frequency of the water delivery pump 7 in accordance with the chiller operating command (step S4).

Next, the first controller C calculates an operational temperature range of the chiller 1, then outputs information on the calculated operational temperature range of the chiller 1 to the second controller 5 (step S5), and returns to the process in step S1.

<Output of Information on Operational Temperature Range from First Controller C>

Figure 5:
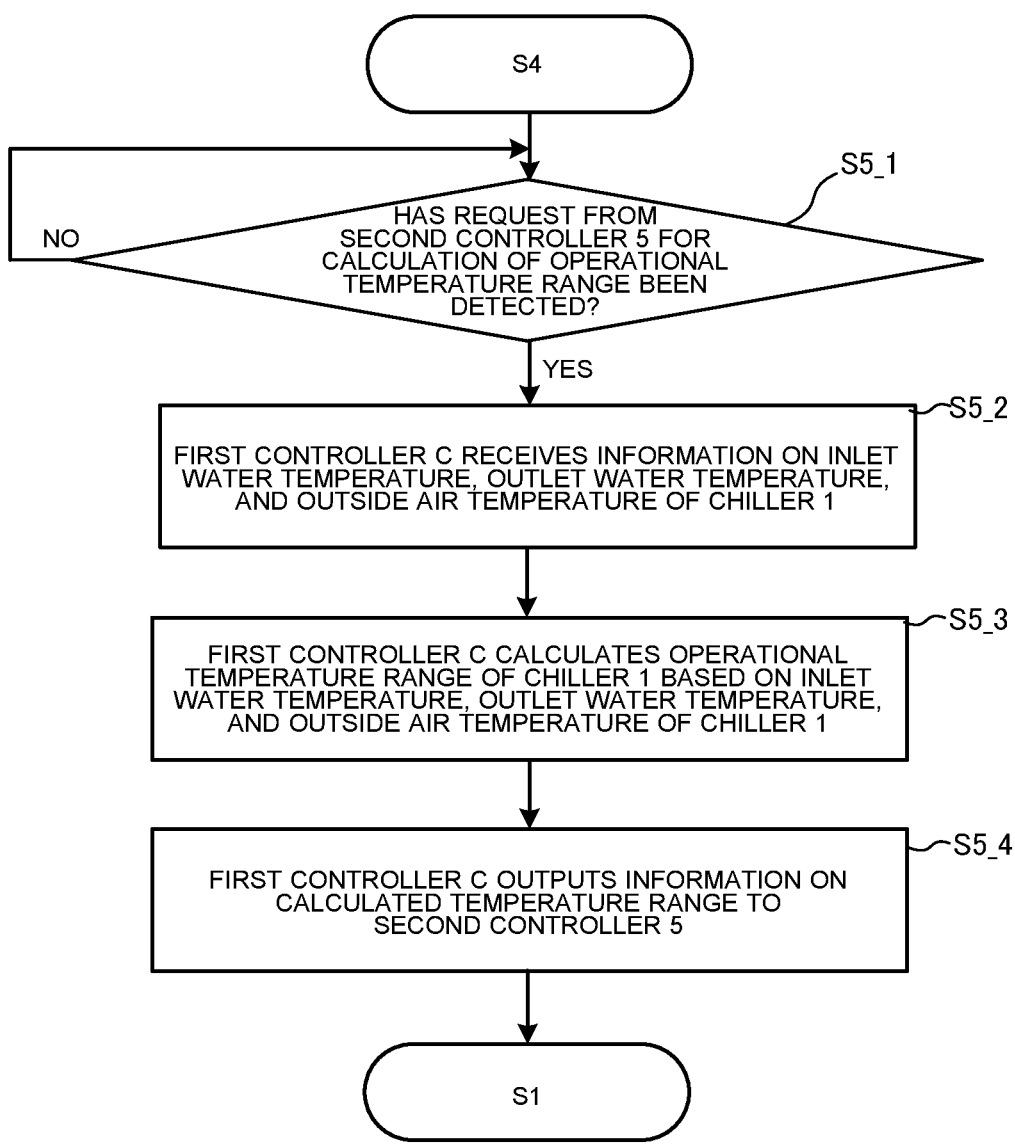
FIG. 5 is a flowchart for describing an output of information on a temperature range from a first controller in the air-conditioning apparatus according to Embodiment 1.

Next, the method for calculating a temperature range in step S5 of FIG. 4 is described. FIG. 5 is a flowchart for describing an output of information on the temperature range from the first controller C in the air-conditioning apparatus according to Embodiment 1. FIG. 5 is an explanatory diagram for describing step S5 of FIG. 4 in detail.

As illustrated in FIG. 5, the first controller C determines whether a request from the second controller 5 for calculation of the temperature range has been detected (step S5_1). In step S5_1, when the request for calculation of the temperature range is not detected (NO in step S5_1), the first controller C continuously performs the determination in step S5_1. In step S1, when determining that the request for calculation of the temperature range has been detected (YES in step S5_1), the first controller C shifts to the process in step S5_2.

The first controller C receives information on the inlet water temperature, the outlet water temperature, and the outside air temperature of the chiller 1 (step S5_2). That is, the first controller C_1 receives information on the inlet water temperature measured by the first sensor IS_1, the outlet water temperature measured by the second sensor OS_1, and the outside air temperature measured by the third sensor S_1. The first controller C_2 receives information on the inlet water temperature measured by the first sensor IS_2, the outlet water temperature measured by the second sensor OS_2, and the outside air temperature measured by the third sensor S_2. The first controller C_3 receives information on the inlet water temperature measured by the first sensor IS_3, the outlet water temperature measured by the second sensor OS_3, and the outside air temperature measured by the third sensor S_3.

Next, the first controller C calculates an operational temperature range of the chiller 1 based on the inlet water temperature, the outlet water temperature, and the outside air temperature of the chiller 1 (step S5_3), then outputs information on the calculated temperature range to the second controller 5 (step S5_4), and returns to the process in step S1.

That is, the first controller C_1 calculates an operational temperature range of the chiller 1_1 based on the inlet water temperature, outlet water temperature, and outside air temperature of the chiller 1_1, and outputs information on the calculated temperature range of the chiller 1_1 to the second controller 5. The first controller C_2 calculates an operational temperature range of the chiller 1_2 based on the inlet water temperature, outlet water temperature, and outside air temperature of the chiller 1_2, and outputs information on the calculated temperature range of the chiller 1_2 to the second controller 5. The first controller C_3 calculates an operational temperature range of the chiller 1_3 based on the inlet water temperature, outlet water temperature, and outside air temperature of the chiller 1_3, and outputs information on the calculated temperature range of the chiller 1_3 to the second controller 5.

Figure 6:
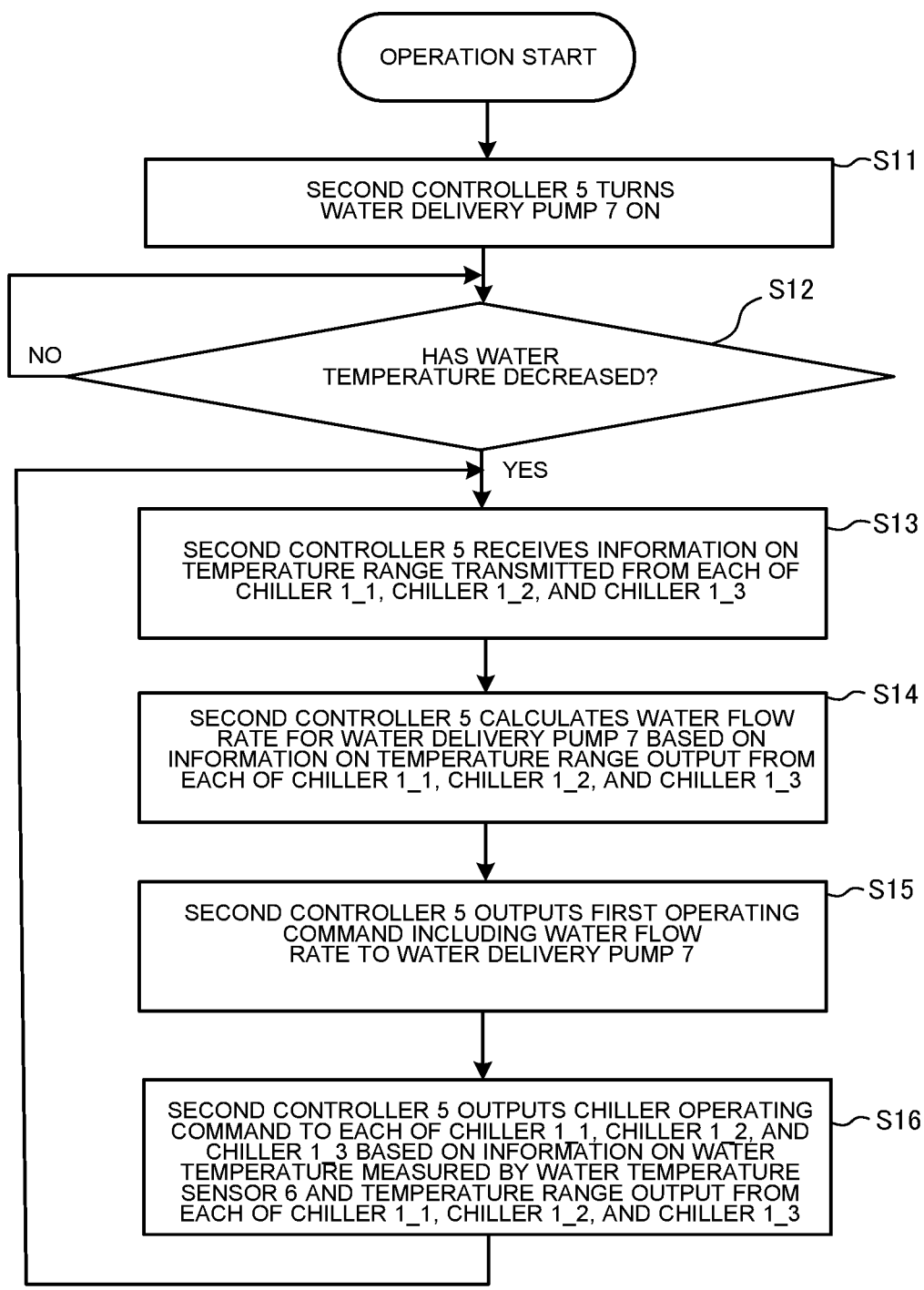
FIG. 6 is a flowchart for describing operation of the second controller in the air-conditioning apparatus according to Embodiment 1.

FIG. 6 is a flowchart for describing operation of the second controller 5 in the air-conditioning apparatus according to Embodiment 1.

As illustrated in FIG. 6, upon the start of operation, the second controller 5 turns the water delivery pump 7 on (step S11). Next, the second controller 5 determines whether the temperature of water flowing through the feed pipe 3 and the return pipe 4 has decreased (step S12).

In this determination of whether the water temperature has decreased, for example, when receiving a signal indicating a decrease in the water temperature from the load 2, the second controller 5 determines that the water temperature has decreased. The signal indicating a decrease in the water temperature is output from the load 2 to the second controller 5 when the temperature of water circulating to the load 2 is lower than a target temperature of water circulating to the load 2. The determination of whether the water temperature has decreased is not limited to being performed by this method. The second controller 5 may determine whether the water temperature has decreased based on the water temperature measured by the water temperature sensor 6.

When determining that the water temperature does not decrease (NO in step S12), the second controller 5 continuously performs the determination in step S12. When determining that the water temperature has decreased (YES in step S12), the second controller 5 receives information on a temperature range transmitted from each of the chiller 1_1, the chiller 1_2, and the chiller 1_3 (step S13).

Next, the second controller 5 calculates a water flow rate for the water delivery pump 7 based on information on the temperature range output from each of the chiller 1_1, the chiller 1_2, and the chiller 1_3 (step S14).

Then, the second controller 5 outputs a first operating command including information on the water flow rate calculated in step S14 to the water delivery pump 7 (step S15).

Next, the second controller 5 outputs a chiller operating command to each of the chiller 1_1, the chiller 1_2, and the chiller 1_3 based on information on the water temperature measured by the water temperature sensor 6 and the temperature range output from each of the chiller 1_1, the chiller 1_2, and the chiller 1_3 (step S16).

Modification of Embodiment 1

In Embodiment 1, the first controller C has been described as calculating a temperature range and outputting information on the calculated temperature range to the second controller 5 upon request for calculation of the temperature range from the second controller 5. In a modification of Embodiment 1, the first controller C constantly outputs information on the temperature range to the second controller 5.

Figure 7:
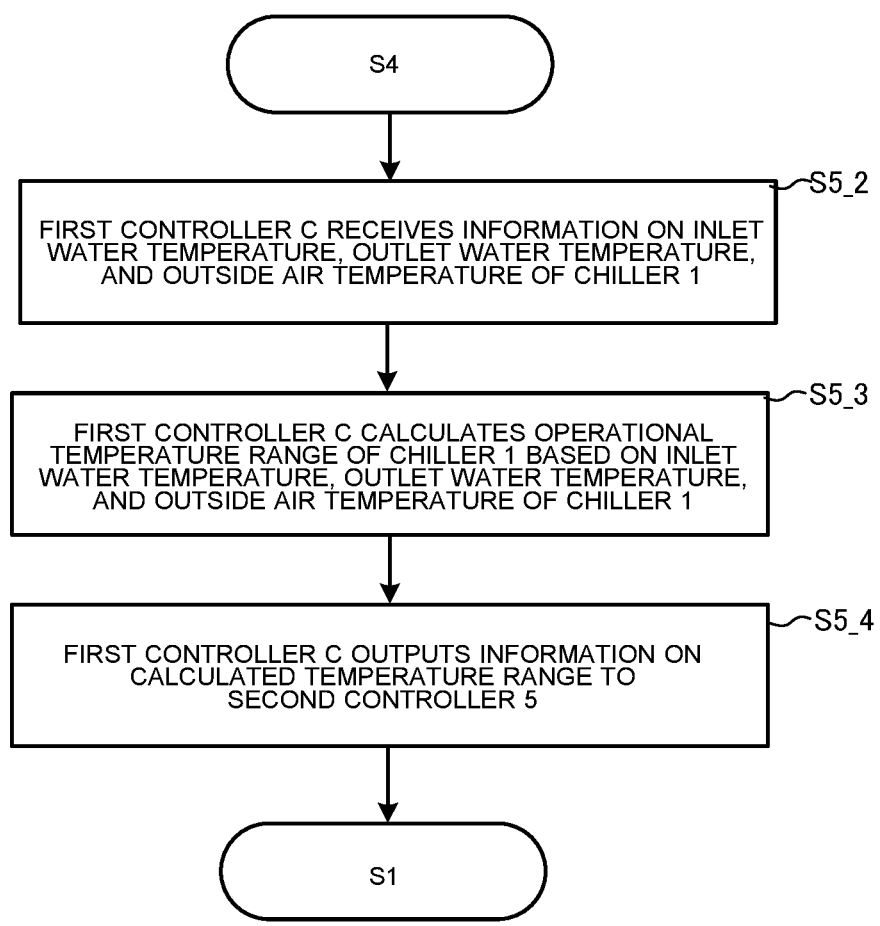
FIG. 7 is a flowchart for describing a modification of the operation of the first controller in the air-conditioning apparatus according to Embodiment 1.

FIG. 7 is a flowchart for describing a modification of the operation of the first controller C in the air-conditioning apparatus according to Embodiment 1. Note that the same steps as those in FIG. 5 are denoted by the same reference numerals, and descriptions thereof are omitted. As illustrated in FIG. 7, compared to FIG. 5, the process in step S5 is eliminated, and even when there is not a request for the temperature range from the second controller 5, the first controller C still outputs information on the temperature range to the second controller 5.

<Effects>

In the chiller system A in the air-conditioning apparatus according to Embodiment 1, the second controller 5 controls the water flow rate of water flowing through the feed pipe 3 and the return pipe 4, such that information on the water temperature falls within the temperature range output from the temperature-range calculation unit 11 in the first controller C. Therefore, the chiller 1 can supply water at its target outlet water temperature.

In a conventional chiller system, since the second controller 5 does not receive information on the operational temperature range, the second controller 5 cannot determine whether the chiller operating command satisfies the operational temperature range of the chiller 1. If in this state, the second controller 5 outputs the chiller operating command to the chiller 1, then there is a possibility that the output chiller operating command may fall outside the operational temperature range of the chiller 1.

For example, when the second controller 5 instructs the chiller 1 to reduce its heating capacity in heating operation, to avoid a decrease in the outlet water temperature of the chiller 1, the second controller 5 controls pump operation to reduce the water flow rate with the outlet and inlet water temperatures of the chiller 1 maintained, thereby to reduce the capacity of the chiller 1. When receiving a chiller operating command equal to or lower than the operating range, the chiller 1 is operated at a lower limit of the operational temperature range, and thus decreases the water flow rate since it cannot reduce the capacity any more. As the water flow rate decreases, the difference between the outlet water temperature and the inlet water temperature increases. The capacity is calculated as "capacity=coefficient×difference between outlet water temperature and inlet water temperature×water flow rate." In heating operation, as the outlet water temperature increases, the operation becomes inefficient. Conversely, during cooling, as the outlet water temperature decreases, there is a risk of water freezing or other problem.

Therefore, in a case where the second controller 5 does not acquire information on the operational temperature range of the chiller 1, the second controller 5 does not have information for determining whether and how to change the water flow rate for the water delivery pump 7. This prevents the chiller system from operating efficiently. In a case where the second controller 5 attempts to cause the chiller 1 to operate at a capacity equal to or greater than the upper limit of the operational temperature range of the chiller 1, the capacity of the chiller 1 is insufficient for the operating command from the second controller 5. This prevents the chiller 1 from supplying water at a requested water temperature.

In the chiller system A in the air-conditioning apparatus in Embodiment 1, the chiller 1 inputs information on its operational temperature range to the second controller 5, so that the second controller 5 can select operation with an optimum target outlet water temperature and an optimum water flow rate from the operational temperature range of the chiller 1. Therefore, the chiller 1 supplies water at a stabilized temperature, which makes it possible for the chiller 1 and the water delivery pump 7 to operate with high efficiency in their entirety.

Embodiment 2

Next, the chiller system A in the air-conditioning apparatus according to Embodiment 2 is described.

Figure 8:
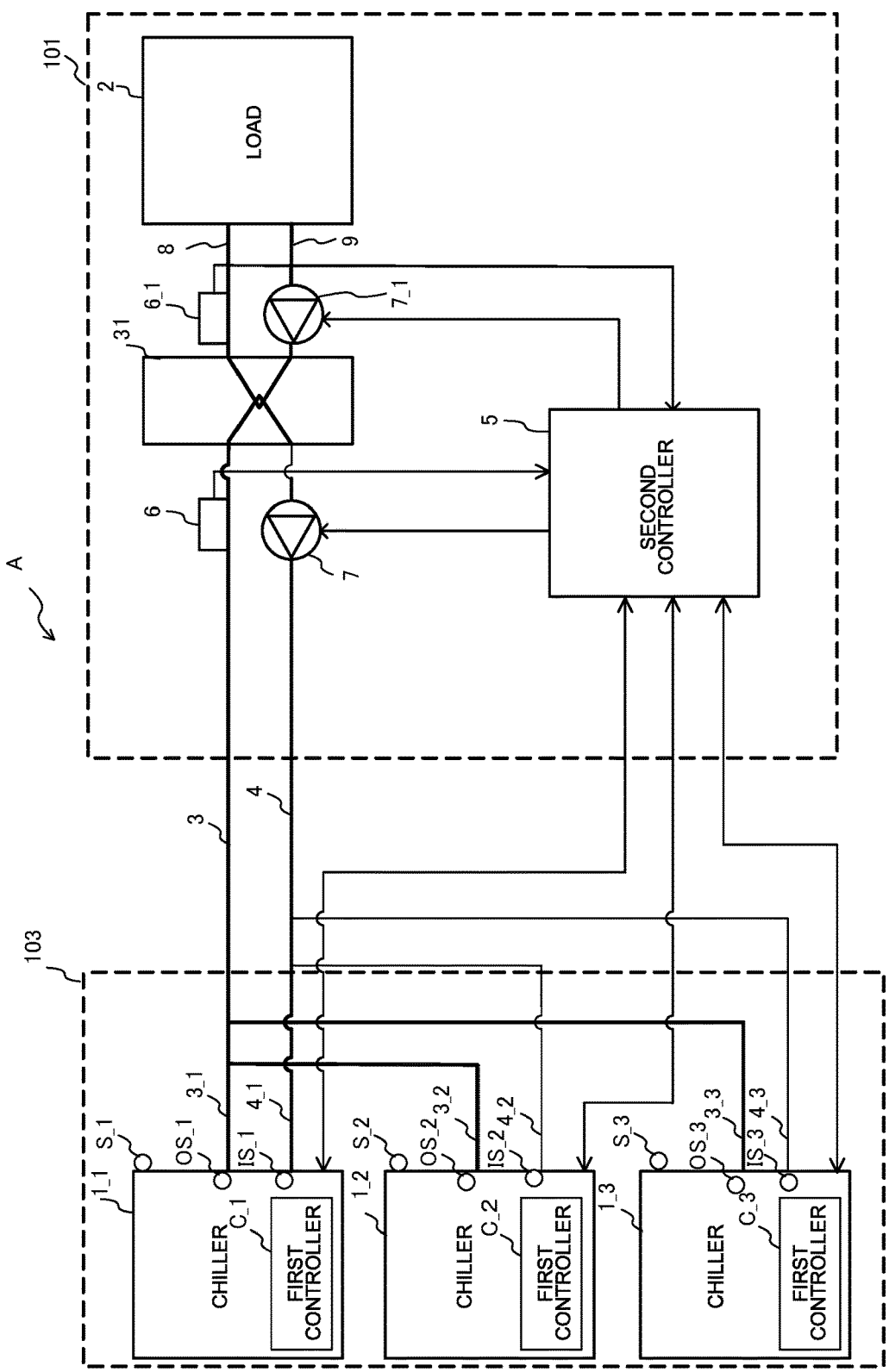
FIG. 8 illustrates the configuration of a chiller system in the air-conditioning apparatus according to Embodiment 2.

FIG. 8 illustrates the configuration of the chiller system A in the air-conditioning apparatus according to Embodiment 2. Note that the same components as those in FIG. 1 are denoted by the same reference numerals, and mainly different components will be described.

As illustrated in FIG. 8, the chiller system A in the air-conditioning apparatus according to Embodiment 2 is provided with a water-water heat exchanger 31 between the chiller 1 and the load 2. In FIG. 8, the feed pipe 3 and the return pipe 4 that are located near the chiller 1_1, the chiller 1_2, and the chiller 1_3 are defined as a primary-side feed pipe and a primary-side return pipe, while a feed pipe 8 and a return pipe 9 that are located near the load 2 are defined as a secondary-side feed pipe and a secondary-side return pipe.

The primary-side feed pipe 3 connects the chiller 1 and the water-water heat exchanger 31. The primary-side return pipe 4 connects the chiller 1 and the water-water heat exchanger 31. The feed pipe 3 is connected to the return pipe 4 in the water-water heat exchanger 31. Water flows through the feed pipe 3 and the return pipe 4 to circulate between the chiller 1 and the water-water heat exchanger 31.

The secondary-side feed pipe 8 connects the load 2 and the water-water heat exchanger 31. The secondary-side return pipe 9 connects the load 2 and the water-water heat exchanger 31. The feed pipe 8 is connected to the return pipe 9 in the water-water heat exchanger 31. Water flows through the feed pipe 8 and the return pipe 9 to circulate between the load 2 and the water-water heat exchanger 31.

The water-water heat exchanger 31 exchanges heat between water flowing through the feed pipe 3 and the return pipe 4 and water flowing through the feed pipe 8 and the return pipe 9.

The feed pipe 8 is provided with a water temperature sensor 6_1. The water temperature sensor 61 is provided on the feed pipe 8 in the vicinity of the load 2. The water temperature sensor 6_1 measures the temperature of water flowing through the feed pipe 8 to be input to the load 2, and outputs information on the measured temperature to the second controller 5.

The return pipe 9 is provided with a secondary-side water delivery pump 7_1. The water delivery pump 7_1 delivers water flowing through the return pipe 9 from the load 2 to the water-water heat exchanger 31. The water delivery pump 7_1 adjusts the water flow rate of water flowing through the return pipe 9 based on a second operating command including information on the water flow rate output from the second controller 5.

The second controller 5 calculates a water flow rate for the water delivery pump 7_1 based on information on the first temperature range output from the first controller C_1, the second temperature range output from the first controller C_2, and the third temperature range output from the first controller C_3. The second controller 5 outputs a second operating command including information on the calculated water flow rate to the water delivery pump 7_1. Accordingly, the water delivery pump 7_1 delivers water at the water flow rate instructed by the second operating command. That is, the second operating command is a command for water flowing through the feed pipe 8 and the return pipe 9.

At the water flow rate for the secondary-side water delivery pump 7_1, the primary-side capacity and the secondary-side capacity become equal. The primary-side capacity is calculated as "water temperature difference between the inlet temperature of water flowing through the feed pipe 3 and the outlet temperature of water flowing through the return pipe 4×primary-side water flow rate× coefficient." The secondary-side capacity is calculated as "Water temperature difference between the inlet temperature of water flowing through the feed pipe 8 and the outlet temperature of water flowing through the return pipe 9×secondary-side water flow rate×coefficient."

Figure 9:
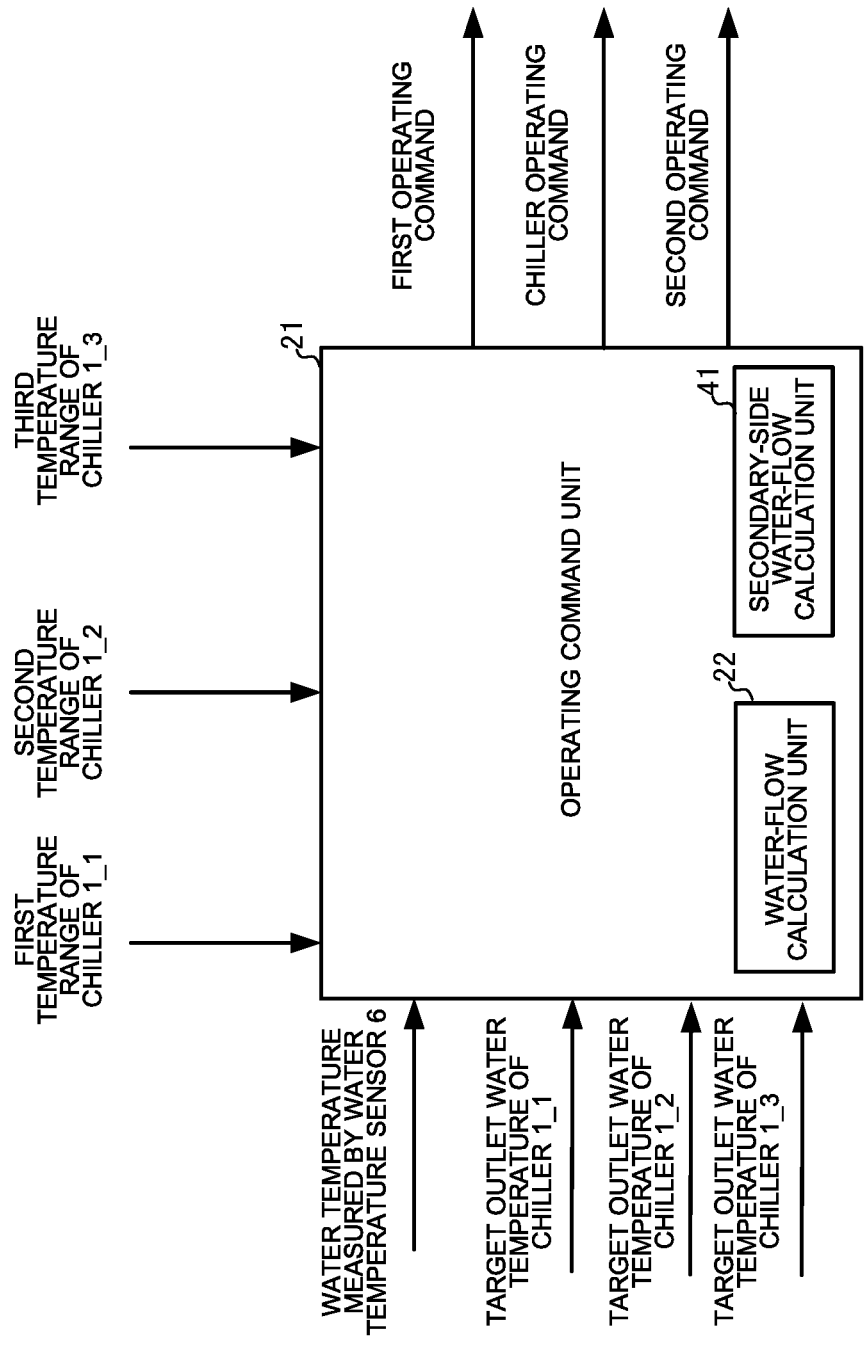
FIG. 9 is a functional block diagram of the second controller in the air-conditioning apparatus according to Embodiment 2.

FIG. 9 is a functional block diagram of the second controller 5 in the air-conditioning apparatus according to Embodiment 2. Note that the same components as those in FIG. 3 are denoted by the same reference numerals, and mainly different components will be described.

As illustrated in FIG. 9, the operating command unit 21 in Embodiment 2 includes a secondary-side water-flow calculation unit 41 in addition to the water-flow calculation unit 22.

The secondary-side water-flow calculation unit 41 calculates a water flow rate for the secondary-side water delivery pump 7_1 based on information on the first temperature range output from the first controller C1_1, the second temperature range output from the first controller C_2, and the third temperature range output from the first controller C_3. The secondary-side water-flow calculation unit 41 outputs a second operating command including information on the calculated water flow rate to the secondary-side water delivery pump 7_1.

Figure 10:
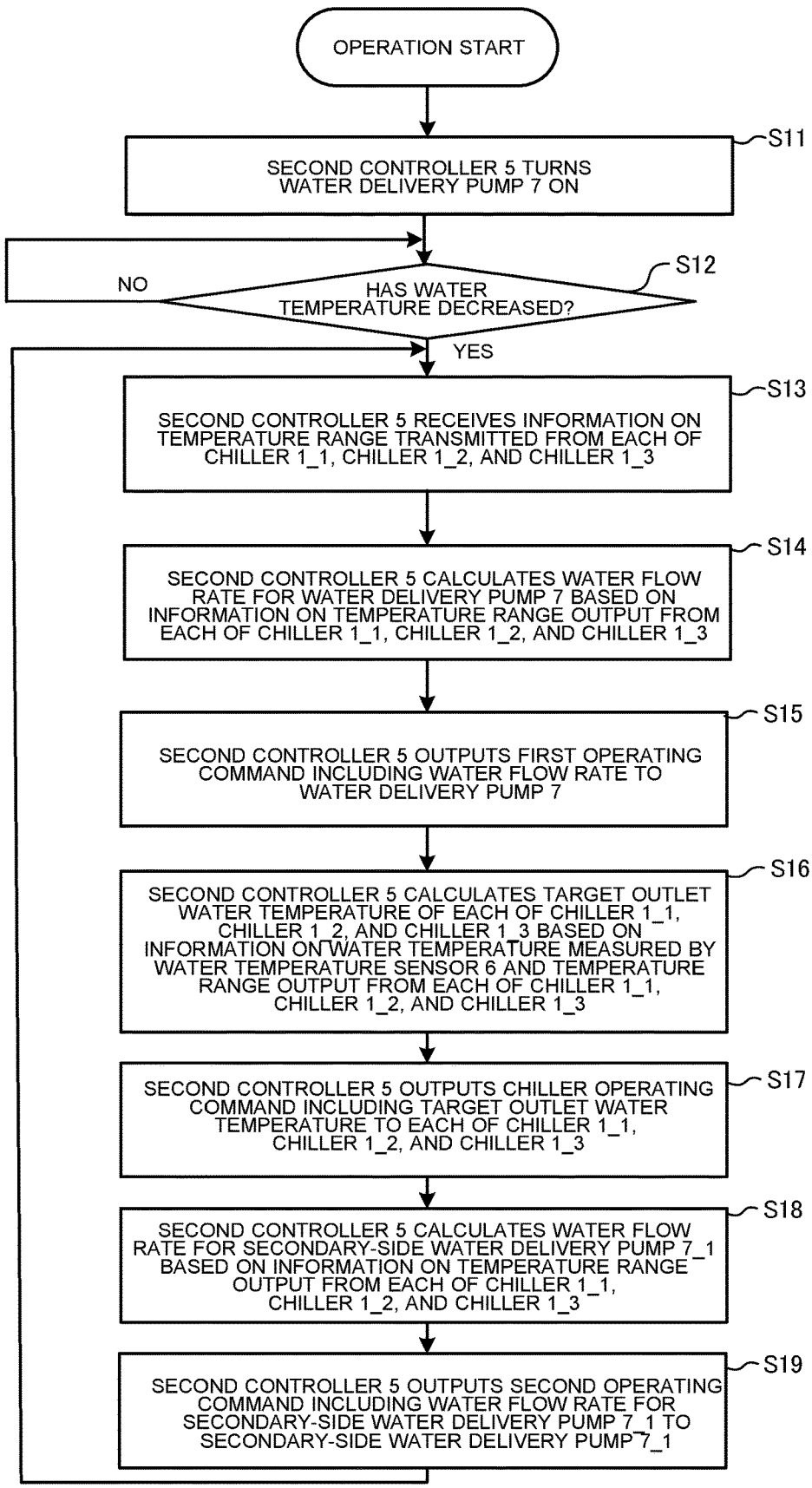
FIG. 10 is a flowchart for describing a flow of output of a second operating command from the second controller in the chiller system in the air-conditioning apparatus according to Embodiment 2.

FIG. 10 is a flowchart for describing a flow of output of the second operating command from the second controller 5 in the chiller system A in the air-conditioning apparatus according to Embodiment 2. Note that the same portions as those in FIG. 6 are denoted by the same reference numerals, and different portions are now described.

After the process in step S17, the second controller 5 calculates a water flow rate for the secondary-side water delivery pump 7_1 based on information on the temperature range output from each of the chiller 1_1, the chiller 1_2, and the chiller 1_3 (step S18).

Next, the second controller 5 outputs the second operating command including information on the water flow rate calculated in step S18 to the secondary-side water delivery pump 7_1 (step S19), and then returns to the process in step S13.

<Effects>

In the chiller system A in the air-conditioning apparatus according to Embodiment 2, the water-water heat exchanger 31 exchanges heat between water flowing through the primary-side feed pipe 3 and return pipe 4 and water flowing through the secondary-side feed pipe 8 and return pipe 9. Therefore, when the primary-side water quality becomes degraded, a secondary-side load 2 can be prevented from being supplied with the water of degraded quality.

Embodiment 3

Next, the air-conditioning apparatus according to Embodiment 3 is described. The air-conditioning apparatus according to Embodiment 3 includes the chiller system A in Embodiment 1 or the chiller system A in Embodiment 2.

Figure 11:
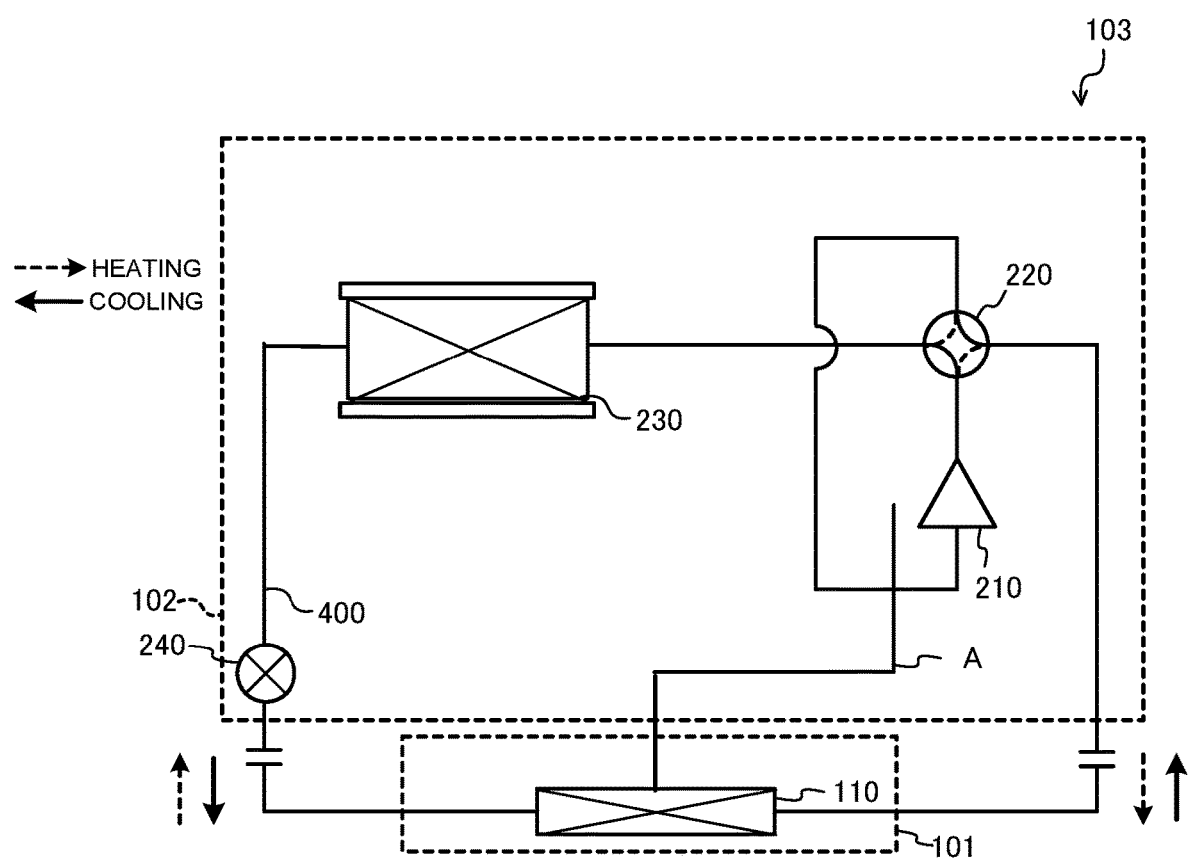
FIG. 11 illustrates an example of a refrigerant circuit diagram of the air-conditioning apparatus according to Embodiment 3.

FIG. 11 illustrates an example of a refrigerant circuit diagram of the air-conditioning apparatus 103 according to Embodiment 3. Note that the solid arrows illustrated in FIG. 11 show the refrigerant flow direction during cooling operation. Further, the dotted arrows illustrated in FIG. 11 show the refrigerant flow direction during heating operation.

The air-conditioning apparatus 103 according to the embodiment includes the indoor unit 101 and the outdoor unit 102. The indoor unit 101 and the outdoor unit 102 are connected by a refrigerant pipe 400. The indoor unit 101 includes an indoor heat exchanger 110. The outdoor unit 102 includes a compressor 210, a four-way valve 220, an outdoor heat exchanger 230, and an expansion valve 240.

The compressor 210 compresses suctioned refrigerant and discharges the compressed refrigerant. Although not particularly limited, the compressor 210 may include, for example, an inverter circuit or other circuit that optionally changes the operating frequency, thereby to change the capacity of the compressor 210. Note that the capacity of the compressor 210 represents the amount of refrigerant to be delivered per unit time. The four-way valve 220 is, for example, a switching valve to switch between the refrigerant flow direction for cooling operation and the refrigerant flow direction for heating operation.

The outdoor heat exchanger 230 exchanges heat between refrigerant and outside air. The outdoor heat exchanger 230 serves as an evaporator during heating operation to evaporate and vaporize the refrigerant. The outdoor heat exchanger 230 serves as a condenser during cooling operation to condense and liquefy the refrigerant.

The expansion valve 240 reduces the pressure of refrigerant and expands the refrigerant. For example, in a case where the expansion valve 240 is made up of an electronic expansion valve, the opening degree of the expansion valve 240 is adjusted based on an instruction provided by a controller or other device (not illustrated). The indoor heat exchanger 110 exchanges heat between refrigerant and air in an air-conditioning target space. The indoor heat exchanger 110 serves as a condenser during heating operation to condense and liquefy the refrigerant. The indoor heat exchanger 110 serves as an evaporator during cooling operation to evaporate and vaporize the refrigerant.

The air-conditioning apparatus 103 having the configuration as described above can perform heating operation and cooling operation by changing the refrigerant flow direction through the four-way valve 220 in the outdoor unit 102.

The embodiments are merely described as examples, and are not intended to limit the scope of the claims. The embodiments can be implemented in various other forms. Various omissions, replacements, and changes can be made without departing from the scope of the embodiments. These embodiments and modifications thereof are included in the scope and gist of the embodiments.

The invention claimed is:

1. A chiller system comprising:
    a chiller configured to output water at an adjusted temperature;
    a load of the chiller;
    a feed pipe through which water flows to be supplied from the chiller to the load, the feed pipe being connected between the chiller and the load;
    a return pipe through which water flows back to the chiller from the load, the return pipe being connected between the chiller and the load;
    a first controller configured to control the chiller; and
    a second controller configured to output a chiller operating command to control the chiller to the first controller, wherein
    the chiller includes
        a first sensor configured to measure an inlet water temperature of the water flowing through the return pipe to the chiller,
        a second sensor configured to measure an outlet water temperature of the water flowing through the feed pipe from the chiller, and
        a third sensor configured to measure an outside air temperature at a location where the chiller is installed, and
    the first controller includes at least one processor and/or at least one circuit configured to
        calculate a temperature range that is operational for the chiller based on the inlet water temperature measured by the first sensor, the outlet water temperature measured by the second sensor, and the outside air temperature measured by the third sensor, and then output the temperature range which is calculated to the second controller, wherein in the temperature range that is operational the chiller operates such that the outlet water temperature of the chiller becomes a target outlet water temperature.

2. The chiller system of claim 1, wherein the second controller
    is configured to control a water flow rate at which water flows through the feed pipe and the return pipe based on the temperature range.

3. The chiller system of claim 1, comprising a water delivery pump configured to deliver water flowing through the return pipe from the load to the chiller, wherein
    the second controller is configured to calculate a water flow rate at which the water delivery pump discharges water based on the temperature range which is output from the first controller, and output a first operating command including the water flow rate which is calculated to the water delivery pump.

4. The chiller system of claim 1, comprising a water temperature sensor configured to measure a water temperature of water flowing through the feed pipe, wherein
    the first controller is configured to output the target outlet water temperature of the chiller to the second controller, and
    the second controller is configured to output the chiller operating command based on the water temperature measured by the water temperature sensor, a temperature range output from the first controller, and the target outlet water temperature of the chiller which is output from the first controller.

5. The chiller system of claim 1, wherein the first controller is configured to calculate the temperature range when a request for calculation of the temperature range from the second controller is detected.

6. The chiller system of claim 1, comprising a water-water heat exchanger provided on the feed pipe and the return pipe, wherein
    the feed pipe includes a primary-side feed pipe connecting the chiller and the water-water heat exchanger, and a secondary-side feed pipe connecting the water-water heat exchanger and the load,
    the return pipe includes a primary-side return pipe connecting the chiller and the water-water heat exchanger, and a secondary-side return pipe connecting the water-water heat exchanger and the load,
    the primary-side feed pipe and the primary-side return pipe are connected in the water-water heat exchanger, while the secondary-side feed pipe and the secondary-side return pipe are connected in the water-water heat exchanger,
    the water-water heat exchanger exchanges heat between water flowing through the primary-side feed pipe and the primary-side return pipe and water flowing through the secondary-side feed pipe and the secondary-side return pipe,
    the chiller system comprises a secondary-side water delivery pump configured to deliver water to the water-water heat exchanger, and
    the second controller is configured to calculate a water flow rate for the secondary-side water delivery pump based on the temperature range which is output from the first controller, and outputs a second operating command including the water flow rate which is calculated to the secondary-side water delivery pump.

7. An air-conditioning apparatus comprising:
the chiller system of claim 1,
an indoor unit; and
an outdoor unit connected to the indoor unit by a pipe through which refrigerant circulates, the outdoor unit including a heat exchanger configured to exchange heat between the refrigerant and outside air, wherein
water flowing through the feed pipe and the return pipe exchanges heat with the load.

8. The air-conditioning apparatus of claim 7, wherein the load is a part of the indoor unit.

9. The chiller system of claim 1, wherein
the second controller is configured to, in response to a water temperature measured by a water temperature sensor in a vicinity of the load and configured to measure the water temperature of water flowing through the feed pipe not reaching the target outlet water temperature due to a capacity of the chiller becoming insufficient, output the chiller operating command to the chiller to decrease a frequency of water delivery pump in the chiller and increase the frequency of a compressor in an outdoor unit.

10. The chiller system of claim 1, wherein
the second controller is configured to, in response to a water temperature measured by a water temperature sensor in a vicinity of the load and configured to measure the water temperature of water flowing through the feed pipe not reaching the target outlet water temperature due to a capacity of the chiller becoming excessive, output the chiller operating command to the chiller, to decrease a frequency of a water delivery pump in the chiller system and minimize the frequency of a compressor in an outdoor unit.

11. The chiller system of claim 1, wherein
the second controller is configured to, in response to a water temperature of water flowing to the load being lower than a target temperature of water circulating to the load,
calculate a water flow rate at which water is discharged from a water delivery pump that adjusts the water flow rate of water flowing through the return pipe from the load based on the temperature range for each chiller of one or more chillers in the chiller system, and control the water delivery pump to the water flow rate which is calculated, and
determine the chiller operating command to be output to each chiller of the one or more chillers in the chiller system based on the water flow rate which is calculated and the temperature range which is output from respectively each chiller of the one or more chillers, and output the chiller operating command which is determined for respectively each chiller to each chiller of the one or more chillers.

12. The chiller system of claim 1,
wherein the chiller system is adapted to include a plurality of chillers including the chiller, each chiller of the plurality of chillers includes a respective first controller,
wherein the second controller is configured to
determine the chiller operating command to be output to each chiller of the plurality of chillers in the chiller system based on the temperature range which is output from each chiller of the plurality of chillers, and
output the chiller operating command which is determined for respectively each chiller to each chiller of the plurality of chillers.

13. The chiller system of claim 1, wherein
the second controller is further configured to
calculate a water flow rate at which water is discharged from a water delivery pump that adjusts the water flow rate of water flowing through the return pipe from the load based on the temperature range which was output from the first controller, and control the water delivery pump to the water flow rate which is calculated, and
determine the chiller operating command to be output to the chiller based on the water flow rate which is calculated and the temperature range which is output from the chiller, and output the chiller operating command which is determined to the chiller.

14. The chiller system of claim 1, wherein
the second controller is configured to
input the temperature range which is calculated,
determine a water flow rate for a water delivery pump of the chiller system so that the outlet water temperature of the chiller is in the temperature range which is calculated,
determine the chiller operating command to control the chiller to the temperature range which is calculated based on the water flow rate which is determined,
control the water delivery pump to the water flow rate which is determined, and output the chiller operating command which is determined to the chiller, and
the first controller is configured to control the chiller based on the chiller operating command which is output from the second controller.

15. The chiller system of claim 1, wherein
the temperature range that is operational is calculated by the first controller using a predefined relationship between the temperature range, the inlet water temperature, the outlet water temperature, and the outside air temperature.

* * * * *